(12) United States Patent
Kheirandish et al.

(10) Patent No.: US 9,464,664 B2
(45) Date of Patent: Oct. 11, 2016

(54) POLYPROPYLENE WITH LIVING HINGE PROPERTIES

(75) Inventors: Saeid Kheirandish, Neuss (DE); Petar Doshev, Linz (AT); Michael Reisecker, Hohenzell (AT); David Friel, Copenhagen (DK); Sybille Simon, Linz (AT)

(73) Assignee: Borealis AG (AT)

( * ) Notice: Subject to any disclaimer, the term of this patent is extended or adjusted under 35 U.S.C. 154(b) by 568 days.

(21) Appl. No.: 13/877,442

(22) PCT Filed: Oct. 5, 2011

(86) PCT No.: PCT/EP2011/067402
§ 371 (c)(1),
(2), (4) Date: Oct. 2, 2013

(87) PCT Pub. No.: WO2012/045782
PCT Pub. Date: Apr. 12, 2012

(65) Prior Publication Data
US 2014/0024794 A1 Jan. 23, 2014

(30) Foreign Application Priority Data
Oct. 6, 2010 (EP) ..................... 10186753

(51) Int. Cl.
*C08F 210/06* (2006.01)
*C08L 23/14* (2006.01)
*F16C 11/12* (2006.01)
*C08F 10/06* (2006.01)
C08F 110/06 (2006.01)
C08L 23/10 (2006.01)
E05D 1/02 (2006.01)

(52) U.S. Cl.
CPC .............. *F16C 11/12* (2013.01); *C08F 10/06* (2013.01); *C08L 23/142* (2013.01); *C08F 110/06* (2013.01); *C08F 210/06* (2013.01); C08L 23/10 (2013.01); C08L 2205/02 (2013.01); C08L 2205/025 (2013.01); *C08L 2308/00* (2013.01); *C08L 2314/02* (2013.01); *E05D 1/02* (2013.01)

(58) Field of Classification Search
CPC ...... C08L 23/142; C08L 23/10; C08L 23/12; C08L 2205/02; C08L 2205/025; C08L 2308/00; C08L 2314/02; C08F 10/06; C08F 210/06; C08F 210/16; F16C 11/04; F16C 11/12; E05D 1/02
USPC ................ 525/240, 242; 526/348, 348.6
See application file for complete search history.

(56) References Cited

U.S. PATENT DOCUMENTS

2004/0198929 A1* 10/2004 Jaaskelainen ......... C08F 210/06
526/73
2006/0235172 A1* 10/2006 Vestberg ................ C08F 10/06
526/124.3

FOREIGN PATENT DOCUMENTS

| CN | 1520433 A | 8/2004 |
| CN | 1802392 A | 7/2006 |
| CN | 102695757 A | 9/2012 |
| EP | 1484345 A1 | 12/2004 |
| EP | 1941997 B1 | 5/2009 |
| WO | WO 2007/071445 A1 * | 6/2007 |
| WO | 2011000557 A1 | 6/2011 |

OTHER PUBLICATIONS

Australian Office Action dated Nov. 20, 2013.
Chinese Office Action dated Jun. 14, 2016.

* cited by examiner

*Primary Examiner* — Roberto Rabago
(74) *Attorney, Agent, or Firm* — Tarolli, Sundheim, Covell & Tummino LLP

(57) ABSTRACT

The present invention relates to a polypropylene which has—a melt flow rate MFR(230° C., 2.16 kg) of at least 13 g/10 min,—an amount of xylene solubles XS of 6.0 wt % or less, and—a crystalline fraction, wherein at least 10% of the crystalline fraction melts the temperature range of from 160 to 170° C., as determined by the stepwise isothermal segregation technique (SIST).

7 Claims, 1 Drawing Sheet

POLYPROPYLENE WITH LIVING HINGE PROPERTIES

RELATED APPLICATION

This application is a National Phase filing of PCT/EP2011/067402, filed Oct. 5, 2011, and claims priority to European Application No. 10186753.9, filed Oct. 6, 2010, the subject matter of which are incorporated herein by reference in their entirety.

The present invention relates to a polypropylene composition which is useful for the preparation of a plastic hinge, and to an article comprising such a plastic hinge.

A plastic hinge, frequently also referred to as a living hinge, is an integrated and flexible connection between two pieces of a molded polymer part, allowing them to bend along the line of the hinge. With regard to the selection of appropriate polymer materials, it has to be considered that hinges made of brittle polymers such as polystyrene or polycarbonate are not useful and will break after a few bending cycles. Frequently used polymers are polypropylene, polyethylene or polyoxymethylene. Further information about living or plastic hinges is provided in *Polypropylene: An A-Z Reference*, edited by J. Karger-Kocsis, 1999 (Kluwer Publishers), pp. 383-391, "Living or plastic hinges", I. Naundorf and P. Eyerer.

Typically, plastic hinges are prepared by injection moulding (see e.g. Polypropylene Handbook, $2^{nd}$ edition (2005), p. 427, 7.3.1.7 "Living Hinges").

In principle, a polypropylene useful for the preparation of a plastic hinge should have high stiffness while keeping impact strength on a sufficiently high level. Furthermore, with regard to processability, it is desired to have a polymer of low viscosity. An important property of the plastic hinge to be aimed at is high fatigue strength, i.e. maintaining beneficial mechanical properties even after having subjected the plastic hinge to a high number of bending cycles. As the properties mentioned above are to some extent conflicting with each other, it still remains a challenge to provide an improved balance of these properties.

WO 2007/122239 A1 describes the preparation of a polypropylene having a melt flow rate MFR(230° C., 2.16 kg) of from 45 to 150 g/10 min. According to WO 2007/122239, the polypropylene is suitable for the preparation of a living hinge.

It is an object of the present invention to provide a polypropylene having an improved balance between stiffness, impact strength and processability, and from which a plastic hinge of high fatigue strength can be prepared.

The object is achieved by providing a polypropylene which has
  a melt flow rate MFR(230° C., 2.16 kg) of at least 13 g/10 min,
  an amount of xylene solubles XS of 6.0 wt % or less, and
  a crystalline fraction, wherein at least 10% of the crystalline fraction melts in the temperature range of from 160 to 170° C., as determined by the stepwise isothermal segregation technique.

As will be discussed in further detail below, it has been realized in the present invention that a polypropylene simultaneously complying with the properties as defined above shows high stiffness while maintaining impact strength on a sufficiently high level and has a sufficiently low viscosity so as to provide improved processability, in particular for injection moulding. Furthermore, a living hinge prepared from said polypropylene shows improved hinge performance properties.

Preferably, the polypropylene is a propylene copolymer comprising comonomer units derived from ethylene and/or a $C_{4-12}$ alpha-olefin.

BRIEF DESCRPTION OF THE DRAWINGS

Figure 1:
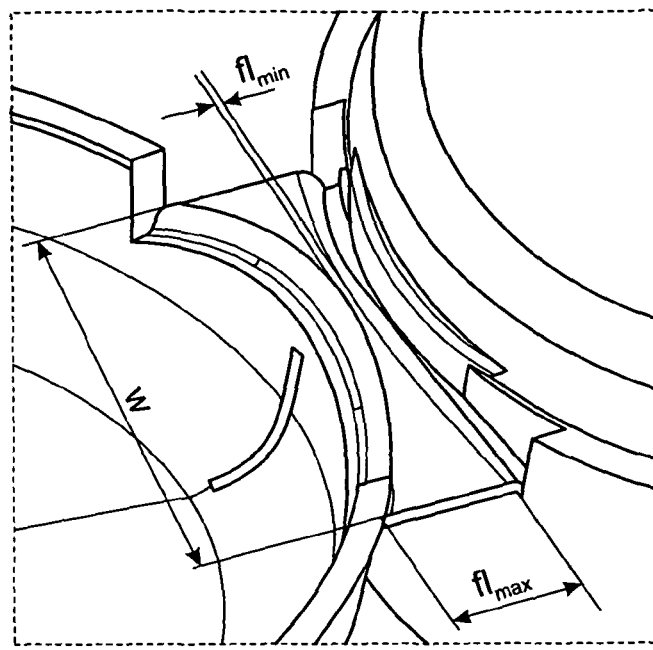
FIG. 1 illustrates a schematic view of a flip-top dosing cap.

In a preferred embodiment, the comonomer units are derived from ethylene.

Preferably, the comonomer content of the polypropylene is 4.0 wt % or less, more preferably 3.5 wt % or less.

In a preferred embodiment, the comonomer content of the polypropylene is within the range of from 4.0 wt % to 0.5 wt %, more preferably 3.5 wt % to 1.0 wt %, even more preferably 3.0 wt % to 1.5 wt %.

Preferably, the polypropylene has a melting temperature of from 146 to 164° C., more preferably 150 to 160° C., even more preferably 152 to 158° C. Melting temperature Tm is measured via DSC as described below (see section 7 under the headline "Measuring methods").

As indicated above, the melt flow rate MFR(230° C., 2.16 kg) of the polypropylene is at least 13 g/10 min.

Preferably, the melt flow rate MFR(230° C., 2.16 kg) of the polypropylene is at least 14 g/10 min, more preferably at least 16 g/10 min.

In a preferred embodiment, the melt flow rate MFR(230° C., 2.16 kg) of the polypropylene is within the range of from 13 g/10 min to 35 g/10 min, more preferably 14 g/10 min to 30 g/10 min, even more preferably 16 g/10 min to 25 g/10 min.

As indicated above, the polypropylene has an amount of xylene solubles XS of 6.0 wt % or less.

As a first approximation, the amount of xylene solubles XS corresponds to the amount of polymer chains with low molecular weight and/or low stereoregularity.

Preferably, the polypropylene has an amount of xylene solubles XS of 5.5 wt % or less, more preferably 5.0 wt % or less, even more preferably 4.5 wt % or less.

In a preferred embodiment, the polypropylene has an amount of xylene solubles XS of from 1.0 wt % to 6.0 wt %, more preferably 1.0 wt % to 5.5 wt %, even more preferably 1.5 wt % to 5.5 wt %, and most preferably 2.0 wt % to 4.5 wt %.

As indicated above, the polypropylene has a crystalline fraction, wherein at least 10% of the crystalline fraction melts in the temperature range of from 160 to 170° C., as determined by the stepwise isothermal segregation technique (SIST).

All areas/parts of the polypropylene which are in a crystalline state form together the "crystalline fraction" of the polypropylene. As known to the skilled person, polypropylene contains crystalline areas of lamellar morphology, wherein the lamellae of these areas vary in thickness. Crystalline lamellae differing in thickness will also differ in melting temperature. An increase in lamella thickness results in an increase of melting temperature. Polypropylene materials differing in lamella thickness distribution will also differ in their final properties.

The stepwise isothermal segregation technique (SIST) provides information about lamella thickness distribution. The precise measuring method is specified in the example section (see section 6 under the headline "Measuring methods").

Preferably, at least 15%, more preferably at least 17%, even more preferably at least 19% of the crystalline fraction of the polypropylene melts in the temperature range of from 160 to 170° C., as determined by the stepwise isothermal segregation technique (SIST).

In a preferred embodiment, from 10% to 40%, more preferably from 15% to 35%, even more preferably from 17% to 27% of the crystalline fraction of the polypropylene melts in the temperature range of from 160 to 170° C., as determined by the stepwise isothermal segregation technique (SIST).

The polypropylene of the present invention may contain just a single polymer fraction or, alternatively, be a blend of two or more different propylene polymer fractions. In the present invention, it is preferred that the polypropylene contains two or more polymer fractions.

As will be discussed below in further detail, such a polymer made of two or more fractions is preferably obtained by preparing a first polymer fraction in a first polymerisation step, subsequently transferring the first fraction to the next polymerisation reactor where the second fraction is prepared in the presence of the first fraction, optionally followed by one or more additional polymerisation steps in further reactors.

In a preferred embodiment, the polypropylene comprises a first propylene polymer fraction F1 and one or more further propylene polymer fractions, wherein
  the first fraction F1 contains comonomer units derived from ethylene and/or a $C_4$-$C_{12}$ alpha-olefin,
  the ratio of the amount of comonomer units of the first fraction F1 to the amount of comonomer units of the polypropylene is less than 1.0, and
  the ratio of the melt flow rate MFR(230° C., 2.16 kg) of the first fraction to the melt flow rate MFR(230° C., 2.16 kg) of the polypropylene is 3.0 or less.

Preferably, the ratio of the amount of ethylene-derived comonomer units of the first fraction F1 to the amount of ethylene-derived comonomer units of the polypropylene is less than 1.0

In a preferred embodiment, the ratio of the amount of comonomer units, preferably ethylene-derived comonomer units, of the first fraction F1 to the amount of comonomer units, preferably ethylene-derived comonomer units, of the polypropylene is within the range of from 0.1 to 1.0, more preferably from 0.2 to 0.9, even more preferably from 0.5 to 0.8.

Preferably, the amount of comonomer units, preferably ethylene-derived comonomer units, of the first fraction F1 is within the range of 0.8 wt % to 3.0 wt %, more preferably 1.0 wt % to 2.5 wt %.

Preferably, the ratio of the melt flow rate MFR(230° C., 2.16 kg) of the first fraction F1 to the melt flow rate MFR(230° C., 2.16 kg) of the polypropylene is 2.5 or less, more preferably 2.0 or less, even more preferably 1.5 or less.

In a preferred embodiment, the ratio of the melt flow rate MFR(230° C., 2.16 kg) of the first fraction F1 to the melt flow rate MFR(230° C., 2.16 kg) of the polypropylene is within the range of from 0.5 to 3.0, more preferably 0.6 to 2.0, even more preferably 1.05 to 1.5.

Preferably, the melt flow rate MFR(230° C., 2.16 kg) of the first fraction F1 is within the range of from 13 g/10 min to 35 g/10 min, more preferably 14 g/10 min to 30 g/10 min, even more preferably 16 g/10 min to 25 g/10 min.

In a preferred embodiment, the first fraction F1 has an amount of xylene solubles XS of from 1.0 wt % to 6.0 wt %, more preferably 1.5 wt % to 5.0 wt %.

In the present invention, it is possible that the polypropylene comprises just one further propylene polymer fraction F2, i.e. the polypropylene is a blend of two different polymer fractions. Alternatively, the polypropylene composition may additionally contain a third or even a fourth polymer fraction.

As will be discussed below in further detail, the first fraction F1 of the polypropylene is preferably prepared in a loop reactor, subsequently transferred to a gas phase reactor where the second fraction F2 is prepared (i.e. so-called "reactor blending").

Preferably, the weight ratio of the first fraction F1 to the one or more further propylene polymer fractions is within the range of from 30/70 to 70/30, more preferably from 40/60 to 60/40.

In a preferred embodiment, the polypropylene comprises an alpha-nucleating agent (i.e. a nucleating agent favouring/supporting the formation of the alpha crystal phase). In the present invention, it is possible to use those alpha-nucleating agents which are commonly known to the skilled person.

According to a preferred embodiment, the alpha-nucleating agent is a polymeric alpha-nucleating agent which comprises monomer units derived from a vinyl compound of the following chemical formula

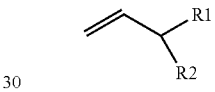

wherein R1 and R2 independently from each other represent a substituted or unsubstituted alkyl, cycloalkyl or aryl, or R1 and R2 together form a saturated, unsaturated or aromatic ring system.

Preferably, R1 and R2 independently from each other represent a $C_{1-6}$ alkyl group, more preferably a $C_{1-4}$ alkyl group, or a 5- or 6-membered cycloalkyl group (cyclopentyl, cyclohexyl).

According to another preferred embodiment, R1 and R2 together form a 5- or 6-membered cycloalkyl group.

Preferably, the vinyl compound is selected from the group consisting of vinyl cyclohexane, vinyl cyclopentane, vinyl 2-methyl cyclohexane and vinyl norbornane, 3-methyl-1-pentene, styrene, p-methyl-styrene, 4-methyl-1-pentene, 3-methyl-1-butene, 3-ethyl-1-hexene, or any mixture thereof.

Preferably, at least 90 mol %, more preferably 100 mol % of the monomer units of the polymeric alpha-nucleating agent are derived from the vinyl compound.

Further information about the polymeric alpha-nucleating agent can be found e.g. in WO 99/24479, WO 00/68315, and EP 1 818 365 A1.

According to a further aspect, the present invention provides a process for preparing the polypropylene as defined above, comprising at least two polymerisation steps.

In a preferred embodiment, a first propylene polymer fraction F1 is prepared in a first step and is subsequently transferred to a polymerisation reactor R2 where a further propylene polymer fraction is prepared in a second step.

With regard to preferred properties of the first polymer fraction F1, reference can be made to the statements already provided above.

Preferably, the first step comprises polymerisation in a slurry reactor R1, such as a loop reactor.

As known to the skilled person, a slurry reactor is a type of reactor which is frequently used in polymerisation processes either alone or in combination with additional reactors, like other slurry reactors or gas phase reactors. The reaction medium in a slurry reactor is either a saturated light hydrocarbon (especially for the manufacture of polyethylene) or liquid monomer, like propylene (for the manufacture of polypropylene).

Appropriate process conditions (temperature, pressure etc.) for adjusting polymer properties such as melt flow rate or comonomer content are known to the skilled person or can easily be verified by routine experimentation.

With regard to preferred ranges for melt flow rate MFR (230° C., 2.16 kg), comonomer content, xylene solubles of the first fraction F1, reference can be made to the discussion provided above.

Optionally, the first step may include pre-polymerisation in a pre-polymerisation reactor PR, followed by polymerisation in the slurry reactor R1. If such a pre-polymerisation reactor PR is used in combination with the slurry reactor R1 in the first step, the polymer obtained directly after the loop reactor then represents the first propylene polymer fraction F1.

The polymerisation reactor R2 can be a slurry reactor such as a loop reactor, or a gas phase reactor. In a preferred embodiment, reactor R2 is a gas phase reactor.

Following the second step, the process of the present invention may comprise further steps wherein additional propylene polymer fractions are prepared.

Preferably, the split between the first step and the second step is within the range of from 30/70 to 70/30, more preferably from 40/60 to 60/40.

This means that the weight ratio of the first propylene polymer fraction F1 prepared in the first step to the further propylene polymer fraction prepared in the second step is preferably of from 30/70 to 70/30, more preferably 40/60 to 60/40.

In the process of the present invention, any stereo-specific catalyst for propylene polymerization can be used, which preferably is capable of catalysing the polymerisation and copolymerisation of propylene and comonomers at a pressure of 500 to 10000 kPa, in particular 2500 to 8000 kPa, and at a temperature of 40 to 110° C., in particular of 60 to 110° C.

In a preferred embodiment, the catalyst comprises a Ziegler-Natta catalyst. A preferred catalyst of the present invention is described in EP 0 591 224 which discloses a method for preparing a pro-catalyst composition from magnesium dichloride, a titanium compound, a lower alcohol and an ester of phthalic acid containing at least five carbon atoms. According to EP 0 591 224, a trans-esterification reaction is carried out at an elevated temperature between the lower alcohol and the phthalic acid ester, whereby the ester groups from the lower alcohol and the phthalic ester change places.

Alternatively, single site catalysts such as metallocene catalysts can be used as well.

Suitable external donors include dicyclo pentyl dimethoxy silane (donor D), cyclo hexyl methyl dimethoxy silane (donor C), diethylaminotriethoxysilane (donor U).

The Al/Do-ratio may vary to a great extent. The higher the ratio, the better the $H_2$-response thereby allowing producing polymers with higher values of $MFR_2$, hence having a higher processability.

According to a further aspect, the present invention provides an article comprising a plastic or living hinge which comprises the polypropylene as described above.

According to a further aspect, the present invention relates to the use of the polypropylene as described above for preparing a plastic or living hinge.

Preferably, the plastic hinge is prepared by injection moulding.

The present invention will now be described in further detail by making reference to the following Examples.

EXAMPLES

I. Measuring Methods

If not indicated otherwise, the parameters mentioned in the present invention are measured by the following measuring methods.

1. Melt Flow Rate MFR

Melt flow rate was measured according to ISO 1133 at 230° C. and 2.16 kg (MFR2.16 kg/230° C.).

2. Tensile Modulus

Tensile modulus was determined according to ISO 527-2/1 B at 1 mm/min. and 23° C. To determine stress at yield and strain at yield, a speed of 50 mm/min. was used. Tensile modulus was determined on 4 mm thick test specimens according to ISO 527-2/1B. The injection moulded test specimens are made according to ISO 1873-2.

3. Charpy Notched Impact Strength

Charpy impact strength was determined according to ISO 179/1eA on injection molded test specimens made according to ISO 1873-2. The dimension of the test specimen was 80×10×4 mm.

4. Amount of Xylene Solubles XS

XS was determined as follows:

2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered with filter paper into two 100 ml flasks.

The solution from the first 100 ml vessel was evaporated in nitrogen flow and the residue dried under vacuum at 90° C. until constant weight is reached.

XS %=(100×m1×v0)/(m0×v1), wherein
m0=initial polymer amount (g)
m1=weight of residue (g)
v0=initial volume (ml)
v1=volume of analyzed sample (ml)

5. Comonomer Content

Quantitative Fourier transform infrared (FTIR) spectroscopy was used to quantify the amount of comonomers. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1\ (A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (720 $cm^{-1}$). The absorbance at 4324 $cm^{-1}$ was used as a reference band.

6. Stepwise Isothermal Segregation Technique (SIST)

The isothermal crystallisation for SIST analysis was performed in a DSC Q 2000 (TA Instruments) differential scanning calorimeter (DSC) DSC on 3±0.5 mg samples.

(i) The samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80 K/min to −10° C. and the melting curve (thermogram) was obtained by heating the cooled sample at a heating rate of 10 K/min up to 200° C. All measurements were performed in a nitrogen atmosphere. The heat flow is recorded as a function of temperature (thermogram) and evaluated through the values of fusion enthalpy ($\Delta Hm(Ti)$) of fractions melting in a given temperature interval (Ti). Individual values are obtained by integration of melting thermogram within following temperature intervals (Ti):

50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C. Total melting enthalpy ($\Delta Hm$) is obtained by integrating of the melting thermogram from the onset to the endpoint.

The value of % of crystalline fraction (see Table 2) in a given temperature interval (Ti) is calculated as $$\Delta Hm(Ti)/\Delta Hm*100 \qquad (1)$$

7. Melting Temperature

Melting temperature Tm was measured via DSC as described below:

Tm was measured with a Mettler TA820 differential scanning calorimetry (DSC) on 3±0.5 mg samples. Both crystallization and melting curves were obtained during 10 K/min cooling and heating scans between −10° C. and 210° C. Melting temperature was taken as the peaks of endotherms.

II. Samples Prepared

In Inventive Example IE1, a polypropylene made of two polymer fractions was prepared. The first fraction was prepared in a loop reactor and subsequently transferred to a gas phase reactor where the second fraction was prepared in the presence of the first fraction. The polypropylene had an ethylene comonomer content of 2.0 wt %. Split between loop and gas phase reactor: 60/40.

In Comparative Example CE1, the polypropylene composition was prepared in a loop reactor. The polypropylene had an ethylene comonomer content of 3.9 wt %.

The catalyst used for all Examples was a 1.9 wt % Ti-Ziegler-Natta-catalyst as described in EP 0 591 224 with triethyl-aluminium (TEA) as co-catalyst and dicyclo pentyl dimethoxy silane as donor. The aluminium to donor ratio was 15 mol/mol.

In the following Table 1, properties of the polypropylene materials are summarized.

TABLE 1

Properties of the polypropylene samples

|  |  | Example IE1 | Comp. Example CE1 |
|---|---|---|---|
| Loop reactor | MFR(230° C., 2.16 kg) [g/10 min] | 19 | 14 |
|  | C2 [wt %] | 1.3 | 3.9 |
|  | Xylene solubles [wt %] | 3 | 6.5 |
| Final | MFR(230° C., 2.16 kg) [g/10 min] | 17 | 14 |
|  | Xylene solubles [wt %] | 3.1 | 6.5 |
|  | C2 [wt %] | 2 | 3.9 |
|  | Melting temperature Tm [° C.] | 155 |  |
|  | Percentage of crystalline fraction melting in the temperature range of from 160 to 170° C. [%] | 21.37 | 3.49 |
|  | Tensile modulus [MPa] | 1556 | 1319 |
|  | Charpy impact 23° C. [kJ/m$^2$] | 4.4 | 5.0 |
|  | Charpy impact 0° C. [kJ/m$^2$] | 1.6 | 1.3 |

In Table 2, SIST data of samples 1E1 and CE1 are shown.

TABLE 2

SIST data of IE1 and CE1

|  | Inventive Example IE1 | | Comparative Example CE1 | |
|---|---|---|---|---|
| T Range (° C.) | $\Delta H$ (J/g) | % of crystalline fraction melting in the indicated T range | $\Delta H$ (J/g) | % of crystalline fraction melting in the indicated T range |
| 50-60 | 0 | 0.00 | 0.1531 | 0.15 |
| 60-70 | 0.4975 | 0.45 | 0.5546 | 0.56 |
| 70-80 | 0.8533 | 0.77 | 1.122 | 1.13 |
| 80-90 | 1.417 | 1.28 | 1.826 | 1.83 |
| 90-100 | 1.792 | 1.62 | 2.398 | 2.41 |
| 100-110 | 1.606 | 1.45 | 2.039 | 2.05 |
| 110-120 | 3.667 | 3.32 | 4.988 | 5.01 |
| 120-130 | 6.993 | 6.32 | 10.19 | 10.23 |
| 130-140 | 11.81 | 10.68 | 17.52 | 17.59 |
| 140-150 | 22.68 | 20.51 | 23.39 | 23.48 |
| 150-160 | 35.65 | 32.23 | 31.97 | 32.09 |
| 160-170 | 23.64 | 21.37 | 3.474 | 3.49 |
| 170-180 | 0 | 0.00 | 0 | 0.00 |
| >180 | 0 | 0.00 | 0 | 0.00 |
|  | 110.6058 | 100 | 99.6247 | 100 |

From each of these polypropylene materials, 400 caps comprising a living hinge were prepared by injection moulding.

Moulding conditions:
Injection Moulding machine:
Engel, 350 to
Mould: 16 cavity mould
Melt-temperature: 210° C.,
Injection pressure: 900 bars
Holding time: 2 sec
Holding pressure: 390 bar, decreasing to 314 bar The moulded articles consisted of flip-top dosing caps with an integral biased living hinge. The moulded articles had an outer diameter of 40 mm and average wall thickness of 1 mm. The integral film hinge had an average thickness of 0.5 mm. The flow length of the film hinge varied from 1 mm (fl$_{min}$) at its symmetrical centre to 9 mm (fl$_{max}$) at its outer edge. The width w of the hinge area was 22 mm. A schematic view of a flip-top dosing cap is shown in FIG. 1.

Each of these 400 caps was subjected to a bending operation and the hinge breaks were recorded. The results are shown in Table 3:

TABLE 3

Results of the living hinge quality test

| Polymer used for preparing the cap containing the living hinge | Hinge breaks (out of 400 caps) |
|---|---|
| Sample from IE1 | 2 |
| Sample from CE1 | 4 |

The significant advantage of the polypropylene material from IE1 over the one of CE1 is a higher stiffness and a lower viscosity (higher MFR) allowing for optimised production times. If the hinge is made of PP of higher stiffness, less cooling time for the injection moulded sample is needed, which means that the sample can be ejected earlier from the mould and cycle time is reduced.

A further test for hinge properties was carried out whereby the hinge area of the caps described above were subjected to a standard tensile test at 5 mm/min cross-head speed.

The moulded articles were prepared for testing by removing material such that a flat section of material remained either side of the hinge area which could be clamped in the tensile tester and the properties of the hinge area assessed. The tensile properties of the sample were then assessed at a cross-head speed of 5 mm/min and the Force and elongation at break were recorded for each sample. A total of 5 samples were tested for each material. The results are shown in FIG. 2.

Figure 2:
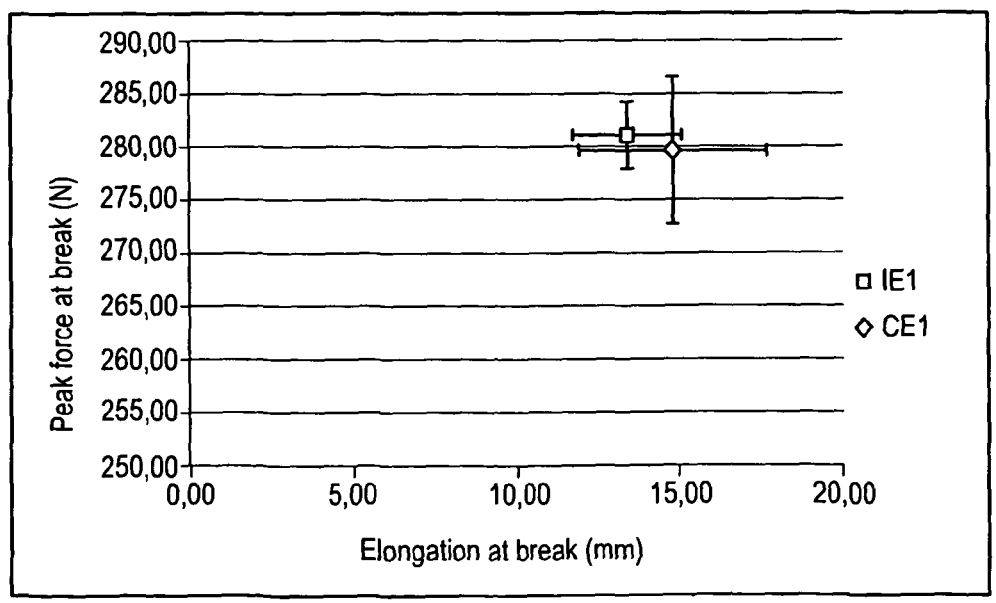
FIG. 2 illustrates a plot of the peak force at break (N) versus elongation at break (mm) for inventive example 1 (IE1) and comparative example 1 (CEI)

In conformity with the results of the bending quality test shown in Table 3, FIG. 2 also demonstrates that the polymers from IE1 and CE 1 provide good hinge properties. However, as already mentioned above, the significant advantage of the polypropylene material from IE1 over the one of CE1 is higher stiffness and a lower viscosity (higher MFR) allowing for optimised production times.

The invention claimed is:

1. A polypropylene comprising:
    a melt flow rate MFR(230° C., 2.16 kg) of at least 13 g/10 min,
    an amount of xylene solubles XS of 6.0 wt % or less,
    a crystalline fraction, wherein 10% to 40% of the crystalline fraction melts in the temperature range of from 160 to 170° C., as determined by the stepwise isothermal segregation technique (SIST), and
    comonomer units derived from ethylene and/or a $C_{4-12}$ alpha-olefin in an amount of 1.5 wt % to 4.0 wt % of the polypropylene.

2. The polypropylene according to claim 1, wherein the polypropylene has a melting temperature of from 146° C. to 164° C.

3. The polypropylene according to claim 1, comprising a first propylene polymer fraction F1 and one or more further propylene polymer fractions, wherein:
    the first fraction F1 contains comonomer units derived from ethylene and/or a $C_4$-$C_{12}$ alpha-olefin,
    the ratio of the amount of comonomer units of the first fraction F1 to the amount of comonomer units of the polypropylene is less than 1.0, and
    the ratio of the melt flow rate MFR(230° C., 2.16 kg) of the first fraction to the melt flow rate MFR(230° C., 2.16 kg) of the polypropylene is 3.0 or less.

4. The polypropylene according to claim 3, wherein the first fraction has an amount of comonomer units within the range of 0.8 wt % to 3.0 wt %, and/or the first fraction has a melt flow rate MFR(230° C., 2.16 kg) within the range of 13 g/10 min to 35 g/10 min.

5. The polypropylene according to claim 3, wherein the weight ratio of the first fraction F1 to the one or more further propylene polymer fractions is within the range of from 30/70 to 70/30.

6. The polypropylene according to claim 1, comprising a polymeric alpha-nucleating agent comprising monomer units derived from a vinyl compound of the following chemical formula:

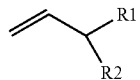

wherein R1 and R2 independently from each other represent a substituted or unsubstituted alkyl, cycloalkyl or aryl, or R1 and R2 together form a saturated, unsaturated or aromatic ring system.

7. An article comprising a plastic hinge which comprises the polypropylene according to claim 1.

* * * * *